(12) United States Patent
Hacena et al.

(10) Patent No.: US 6,253,083 B1
(45) Date of Patent: Jun. 26, 2001

(54) MOBILE SWITCHING CENTER FOR PROVIDING WIRELESS ACCESS HO

(75) Inventors: Farid Hacena, Aurora; Mark Bergren, Naperville, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/358,049

(22) Filed: Jul. 21, 1999

(51) Int. Cl.[7] .................................................. H04Q 7/20
(52) U.S. Cl. ........................ 455/437; 455/436; 455/439; 370/329; 370/331
(58) Field of Search .................................. 455/436, 437, 455/438, 439, 442, 464, 509, 424, 425, 433, 434; 370/331, 332, 329

(56) References Cited

U.S. PATENT DOCUMENTS

| | | | |
|---|---|---|---|
| 5,301,356 | * 4/1994 | Bodin et al. ........................ | 455/33.2 |
| 5,901,145 | * 5/1999 | Sawyer ................................ | 370/332 |
| 5,953,331 | * 9/1999 | Duncan et al. .................... | 370/352 |
| 6,112,088 | * 8/2000 | Haartsen ............................ | 455/437 |
| 6,119,005 | * 9/2000 | Smolik ............................... | 455/436 |
| 6,157,834 | * 12/2000 | Helm et al. ........................ | 455/436 |

* cited by examiner

Primary Examiner—William G. Trost
Assistant Examiner—Congvan Tran
(74) Attorney, Agent, or Firm—Duft, Graziano & Forest, P.C.

(57) ABSTRACT

The system for wireless communication connection handoff service addresses the CDMA radio congestion problem from the mobile switching center point of view, thereby providing a unified approach to the problem of access failures for CDMA wireless communication service. In operation, the mobile subscriber station forms a message and forwards it to the mobile switching center to indicate the signal strength of the various base stations that have responded to the access probe. The mobile switching center saves this data for later use when the mobile subscriber station moves out of range of the initially selected base station. The mobile switching center reviews the stored data and, if a CIC is available to one of the identified base stations, the channel is allocated and the stored data is flushed. Thus, the need for another probe sequence is avoided and the initially provided base station signal strength data is reused to process a call handoff.

8 Claims, 2 Drawing Sheets

MOBILE SWITCHING CENTER FOR PROVIDING WIRELESS ACCESS HO

FIELD OF THE INVENTION

This invention relates to wireless communication systems and, in particular, to a system for providing an improved method of processing handoffs between cells in wireless communication systems.

PROBLEM

It is a problem in the field of wireless communication systems to appropriately allocate cell site and network resources to serve the increasing demand for wireless communication services. There is presently a growing problem with the number of access failures for CDMA wireless communication service and the wireless communication system response to such failures. On a call origination/termination, the wireless communication system sends out a probe to identify the base stations that are available to serve the call origination/termination and their respective signal strengths with respect to the mobile subscriber station. There are typically multiple responses to this transmitted probe, since multiple base stations are in range of the mobile subscriber station.

Typically, the approach to addressing this problem of access failures for CDMA wireless communication service in IS-95B has been to adjust the operation of the mobile subscriber station and/or the base station. More specifically, To enhance the CDMA access, the IS-95B proposed the following procedures.

Access Entry Handoff

Access Probe Handoff

Access Handoff

Channel Assignment into Soft Handoff.

However, only the channel assignment into a soft handoff can result in a significant reduction in access failure. While each individual feature implemented in IS-95B can result in some performance improvement in access failures for CDMA wireless communication service, the piecemeal addressing of the problem of access failures for CDMA wireless communication service can result in wireless communication system overload due to additional call processing required for each of the new features. These features can also interact, blocking each other, resulting in the overload of the base station and the mobile switching center, which can cause fatal call processing errors. Thus, there presently no effective solution to the problem of access failures for CDMA wireless communication service.

SOLUTION

The above described problems are solved and a technical advance achieved in the field by the present system for wireless communication connection handoff service. This addresses the CDMA radio congestion problem from the mobile switching center point of view, thereby providing an approach to the problem of access failures for CDMA wireless communication service. In operation, the mobile subscriber station forms a message and forwards it to the mobile switching center to indicate the signal strength of the various base stations that have responded to the access probe through the different base stations. The mobile switching center saves this data for later use when the mobile subscriber station cannot access the would be selected base station due to any failures in the base station such as lack of speech coders, moving out of range, etc. when the mobile subscriber station moves out of range of the initially selected base station. The mobile switching center reviews the stored data and, if a CIC is available to one of the identified base stations, the channel is allocated and the stored data is flushed.

DETAILED DESCRIPTION

Figure 1:
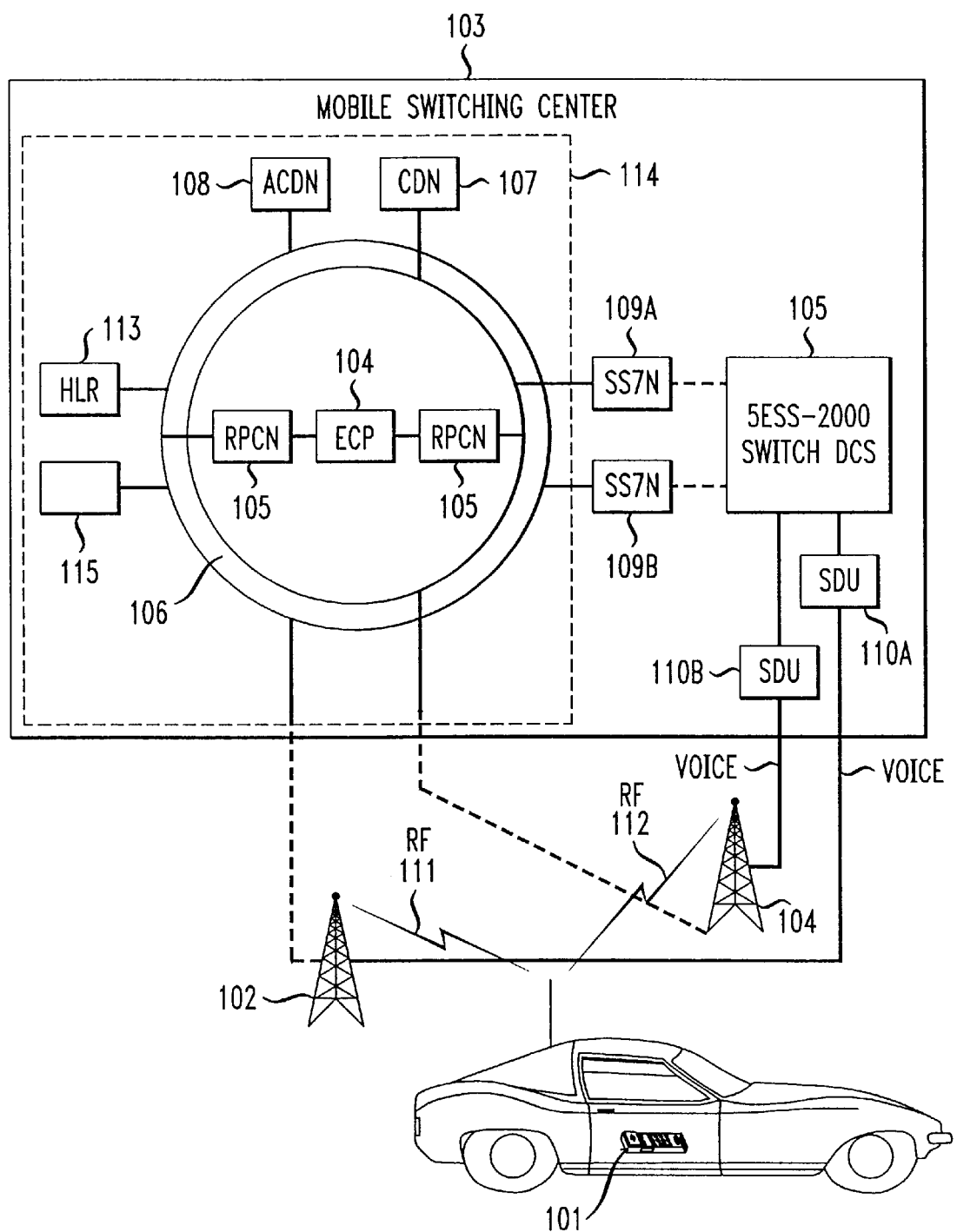
FIG. 1 is the block diagram of the architecture of the present system for providing wireless communication connection handoff service to wireless communication subscribers and one example of an existing commercial wireless communications system in which it is implemented.

Cellular mobile telecommunication systems represent one example of wireless communications systems and function to provide the service of connecting mobile telecommunications customers, each having a mobile subscriber station, to both landbased customers who are served by the common carrier public telephone network as well as other mobile telecommunications customers. In such a system, all incoming and outgoing calls are routed through the Mobile Switching Center (MSC), which is connected to a plurality of base stations which communicate with mobile subscriber stations located in the area covered by the base stations. The mobile subscriber stations are served by the base stations, each of which is located in one cell of a larger service region. Each base station in the service region is connected by a group of communication links to the mobile switching center, with the communication link being either direct or indirect through a controller that may span a plurality of base stations. A communication link transports user data, which may be a digital representation of voice, between the base station and the mobile switching center. Each base station contains a group of radio transmitters and receivers, with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station.

With CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a mobile subscriber station is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The mobile communication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber stations to the selected radio frequency.

Each cell in the ground-based cellular mobile telecommunication network comprises a predetermined volume of space radially arranged around the base station transmitting antenna with the region of space roughly approximating a cylindrical volume having a limited height. Since all of the mobile subscriber stations are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a ground-based mobile subscriber station initiates a call connection, control signals from the local base station transmitter cause the frequency agile transceiver in the ground-based mobile subscriber station to operate at the frequency of operation and orthogonal coding designated for that particular base station. As the ground-based mobile subscriber station moves from one base station to another, the call connection is handed off to the successive base stations and the frequency agile transceiver in the ground-based mobile subscriber station adjusts its frequency of operation and/or orthogonal coding of the transmitter located at the base station in which the ground-based mobile subscriber station is presently operational. Furthermore, with CDMA, it is possible that a mobile subscriber station may be simultaneously communicating with a plurality of base stations. Such a configuration is commonly called a soft handoff and is preferable to hand-offs in which a mobile subscriber station is transferred from one base station to another. The latter type of handoff is commonly called a hard handoff. With a soft handoff, base stations are added or dropped from the plurality of base stations serving the mobile subscriber station as the mobile subscriber station traverses the serving area supported by the mobile switching center. However, all of the base stations in the plurality of base stations serving the mobile subscriber station must communication with the given mobile subscriber station on the same transmitter-receiver frequencies.

Wireless Communications System Architecture

Figure 2:
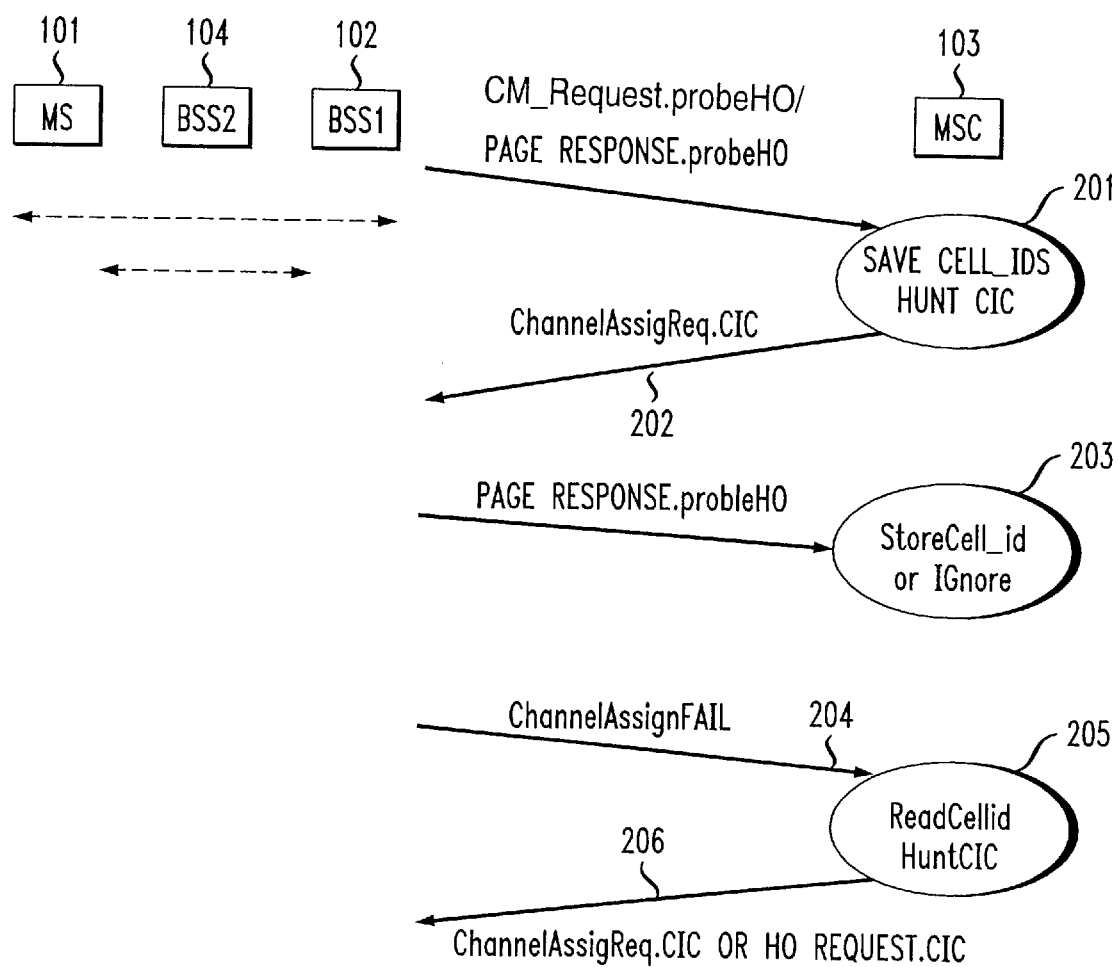
FIG. 2 illustrates in flow diagram form the operation of the present system for providing wireless communication connection handoff service to wireless communication subscribers.

FIG. 1 is the block diagram of the architecture of the present system for providing wireless communication connection handoff service to wireless communication subscribers 100 and one example of an existing commercial wireless communications system in which it is implemented, and FIG. 2 illustrates in flow diagram form the operation of the present system for providing wireless communication connection handoff service to wireless communication subscribers. In the description of the disclosed invention, the major entities are the mobile subscriber station 101, base stations 102 and 104, and the Mobile Switching Center 103.

The Mobile Switching Center 103 contains a mobile telecommunication controller 114 which includes an executive control processor (ECP) 104 connected to a ring peripheral controller node (RPCN) 105, both of which are linked to a ring structure 106. The ring structure 106 provides a transport means for communicating among the entities within the mobile switching center 103. Also contained within the mobile telecommunication controller 114 are call processing/database node (CDN) 107 and an administrative call processing node (ACDN) 108. A major function of these entitles is the execution of call processing associated with the mobile switching center 103. The 5ESS-2000 Switch DCS 105 provides the telephone connectivity between base stations 102 and 104. The 5ESS-2000 Switch DCS is connected to the IMS/CNI Ring 106 through SS7 nodes (SS7N) 109A, 109B. Base stations 102 and 104 are connected to the IMS/CNI Ring 106 through cell site nodes (CSN) 110A, 110B. The mobile switching center 103 has additional functionality such as billing, administration, and maintenance, requiring additional entities. However, the corresponding description of these entities are not essential to the embodiment of the disclosed invention. Base stations 102 and 104 communicate with mobile subscriber station 101 using RF channels 111 and 112, respectively. RF channels 111 and 112 convey both command messages as well as digital data, which may represent voice signals being articulated at the mobile subscriber station 101 and the far-end party. With a CDMA system, the mobile subscriber station communicates with at least one base station 102. In FIG. 1, the mobile subscriber station 101 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a mobile subscriber station 101 may communicate with only a single base station if determined as sufficient by the wireless communications system.

Mobile cellular telecommunication systems provide a plurality of concurrently active communications in the same service area, with the number of concurrently active communication connections exceeding the number of available radio channels. This is accomplished by reusing the channels via the provision of multiple base stations 102, 104 in the service area that is served by a single mobile switching center 103. The overall service area of a mobile switching center 103 is divided into a plurality of "cells", each of which includes a base station 102 and associated radio transmission tower. The radius of the cell is basically the distance from the base station tower to the furthest locus at which good reception between the mobile subscriber station 101 and the base station 102 can be effected. The entire service area of a mobile switching center 103 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells.

Thus, the signals emanating from the radio transmission tower in the particular cell do not interfere with the signals emanating from the radio transmission towers located in each of the surrounding cells because they are at different frequencies and have different orthogonal coding. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations 101 and the base station 102. When a call is initiated, the control channel is used to communicate between the mobile subscriber station 101 involved in the call and the local serving base station 102. The control messages locate and identify the mobile subscriber station 101, determine the dialed number, and identify an available voice/data communication channel consisting of a pair of radio frequencies and orthogonal coding which is selected by the base station 102 for the communication connection. The radio unit in the mobile subscriber station 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 101 to an adjacent cell, when the subscriber moves from the present cell to one of the adjoining cells. The transmitter power of the mobile subscriber station 101 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

Idle Handoff of Mobile Subscriber Stations

An idle handoff occurs when a mobile subscriber station 101 has moved from the coverage area of one base station 102 into the coverage area of another base station 104 during the Mobile Station Idle State. If the mobile subscriber station 101 detects a Pilot Channel signal from another base station 104, that is sufficiently stronger than that of the present base station 102, the mobile subscriber station 101 determines that an idle handoff should occur. Pilot Channels are identified by their offsets relative to the zero offset pilot PN sequence. Pilot offsets are grouped into sets describing their status with regard to pilot searching. The following sets of pilot offsets are defined for a mobile subscriber station 101 in the Mobile Station Idle State. Each pilot offset is a member of only one set.

Active Set

The pilot offset of the Forward CDMA Channel whose Paging Channel is being monitored.

Neighbor Set

The offsets of the Pilot Channels that are likely candidates for idle handoff. The members of the Neighbor Set are specified in the Neighbor List Message, Extended Neighbor List Message, and the General Neighbor List Message.

Remaining Set

The set of all possible pilot offsets.

The mobile subscriber station 101 transmits on the Access Channel using a random access procedure. Many parameters of the random access procedure are supplied by the base station 102 in the Access Parameters Message. The entire process of sending one message and receiving (or failing to receive) an acknowledgment for that message is called an access attempt. One access attempt consists of one or more access sub-attempts. Each transmission in the access sub-attempt is called an access probe. Each access probe consists of an Access Channel preamble and an Access Channel message capsule.

When the mobile subscriber station 101 stops transmitting access probes of an access attempt to one pilot and begins transmitting access probes of an access attempt to another pilot, it is said to perform an access probe handoff. The portion of an access attempt which begins when the mobile subscriber station 101 begins transmitting access probes to one pilot, and ends when the mobile subscriber station 101 either performs an access probe handoff or receives an acknowledgment for that message is called an access sub-attempt. Within an access sub-attempt, access probes are grouped into access probe sequences. The Access Channel used for each access probe sequence is chosen pseudo randomly from among all the Access Channels associated with the present Paging Channel. If there is only one Access Channel associated with the present paging channel, all access probes within an access probe sequence are transmitted on the same Access Channel. If there is more than one access channel associated with the present Paging Channel, all access probes within an access probe sequence may be transmitted on the different Access Channels associated with the present Paging Channel. Each access probe sequence consists of up to 1+NUM_STEPs access probes. The first access probe of each access probe sequence is transmitted at a specified power level relative to the nominal open loop power level. Each subsequent access probe is transmitted at a power level that is adjusted by the PWR_STEPs plus the mean input power change plus the interference correction change from the previous access probe.

The timing of access probes and access probe sequences is expressed in terms of Access Channel slots. The transmission of an access probe begins at the start of an Access Channel slot. There are two types of messages sent on the Access Channel: a response message (one that is a response to a base station message) or a request message (one that is sent autonomously by the mobile subscriber station). Different procedures are used for sending a response message and for sending a request message. The timing of the start of each access probe sequence is determined pseudo randomly. Timing between access probes of an access probe sequence is also generated pseudo randomly. After transmitting each access probe, the mobile subscriber station waits a specified period, $TA=(2+ACC\_TMO_s) \times 80$ ms, from the end of the slot to receive an acknowledgment from the base station. If an acknowledgment is received, the access attempt ends. If no acknowledgment is received and the mobile subscriber station transmits all access probes within an access probe sequence on the same Access Channel associated with the current Paging Channel, the next access probe is transmitted after an additional back off delay, RT, from 0 to 1+PROBE_BKOFFS$_s$ lots. If no acknowledgment is received and the mobile subscriber station pseudo randomly selects an Access Channel from among all Access Channels associated with the current Paging Channel, the next access probe is transmitted after an additional back off delay, RT, from 0 to PROBE_BKOFF$_s$ lots. The mobile subscriber station shall not begin a new access attempt until the previous access attempt has ended.

Access Handoff

The mobile subscriber station 101 is permitted to perform an access handoff to use the Paging Channel with the best pilot strength and an associated Access Channel. The mobile subscriber station 101 is permitted to perform an access handoff when waiting for a response from the base station 102 or before sending a response to the base station 102. An access handoff is permitted after an access attempt while the mobile subscriber station 101 is in the Page Response Subrate or the Mobile Station Origination Attempt Subrate.

When the mobile subscriber station 101 declares a loss of the Paging Channel, the mobile subscriber station 101 shall perform an access handoff while waiting for a response from the base station 102 in the System Access State if the mobile subscriber station 101 is not performing an access attempt and all of the following conditions hold:

The new base station is in the list ACCESS_HO_LIST, ACCESS_HO$_s$ is equal to '1', and The mobile subscriber station is in the Page Response Subrate or the Mobile Station Origination Attempt Subrate.

When the mobile subscriber station 101 declares a loss of the Paging Channel, the mobile subscriber station 101 shall perform an access handoff after receiving a message and before responding to that message while in the System Access State if the mobile subscriber station 101 is not performing an access attempt and all of the following conditions hold:

The new base station is in the list ACCESS_HO_LIST, ACCESS_HO$_s$ is equal to '1', ACCESS_HO_MSG_RSP$_s$ is equal to '1', and The mobile subscriber station is in the Page Response Subrate or the Mobile Station Origination Attempt Subrate.

When the mobile subscriber station 101 declares an insufficiency of the Paging Channel, the mobile subscriber station 101 may perform an access handoff while waiting for a response from the base station 102 in the System Access State if the mobile subscriber station 101 is not performing an access attempt and all of the following conditions hold:

The new base station is in the list ACCESS_HO_LIST, ACCESS_HO$_s$ is equal to '1', and The mobile subscriber station is in the Page Response Subrate or the Mobile Station Origination Attempt Subrate.

When the mobile subscriber station 101 declares an insufficiency of the Paging Channel, the mobile subscriber station 101 may perform an access handoff after receiving a message and before responding to that message while in the System Access State if the mobile subscriber station 101 is not performing an access attempt and all of the following conditions hold:

The new base station is in the list ACCESS_HO_LIST, ACCESS_HO$_s$ is equal to '1', ACCESS_HO_MSG_RSP$_s$ is equal to '1', and The mobile subscriber station is in the Page Response Subrate or the Mobile Station Origination Attempt Subrate.

Before the mobile subscriber station 101 transmits an access probe to the new base station 104, the mobile subscriber station 101 shall update the parameters based on the System Parameters Message, the Access Parameters Message and the Extended System Parameters Message on the associated new Paging Channel and process the parameters from the messages. The mobile subscriber station 101 shall update the parameters based on the Neighbor List Message, Extended Neighbor List Message or the General Neighbor List Message on the associated new Paging Channel and process the parameters from the message. If the mobile subscriber station 101 receives a Global Service Redirection Message which directs the mobile subscriber station 101 away from the new base station 104, the mobile subscriber station 101 shall not access the new base station 104. The mobile subscriber station 101 shall process these messages only once after each access handoff. If ACCESS_PROBE_HO$_s$ is equal to '0' and ACCESS_HO$_s$ is equal to '1', the mobile station may monitor other Paging Channels which are in ACCESS_HO_LIST for $T_{42m}$ seconds after the mobile subscriber station 101 declares a loss of the original Paging Channel during an access attempt.

Access Probe Handoff

The mobile subscriber station 101 is permitted to perform an access probe handoff when the mobile subscriber station 101 is in the Page Response Subrate or the Mobile Station Origination Attempt Subrate. The mobile subscriber station 101 may perform an access probe handoff during an access attempt to a pilot in ACCESS_HO_LIST when the message being sent is the Origination Message or the Page Response Message if all of the following conditions hold:

ACCESS_PROBE_HO$_s$ is equal to '1',

The mobile subscriber station is in the Page Response Subrate or the Mobile Station Origination Attempt Subrate, and The mobile subscriber station has performed fewer than (MAX_NUM_PROBE_HO$_s$+1) access probe handoffs during the current access attempt.

The mobile subscriber station 101 may also perform an access probe handoff during an access attempt to a pilot in ACCESS_HO_LIST when the message being sent is a message other than the Origination Message or the Page Response Message if all of the preceding conditions hold and ACC_PROBE_HO_OTHER_MSG$_s$ is equal to '1'. The mobile subscriber station 101 may also perform an access probe handoff during an access attempt to a pilot not in ACCESS_HO_LIST when the message being sent is the Origination Message or the Page Response Message if all of the following conditions hold:

ACC_HO_LIST_UPD$_s$ is equal to '1',

ACCESS_PROBE_HO$_s$ is equal to '1',

The new pilot is stronger than any pilot in ACCESS_HO_LIST,

The new pilot has the corresponding ACCESS_HO_ALLOWED field in the NGHBR_REC equal to '1', Inclusion of the new pilot in ACCESS_HO_LIST does not cause the Access Channel message to exceed the maximum capsule size, Inclusion of the new pilot in ACCESS_HO_LIST does not cause the number of members to exceed $N_{13m}$, The mobile subscriber station is in the Page Response Subrate or the Mobile Station Origination Attempt Subrate, and The mobile subscriber station has performed fewer than (MAX_NUM_PROBE_$_{HOs}$+1) access probe handoffs during the current access attempt.

The mobile subscriber station 101 may also perform an access probe handoff during an access attempt to a pilot in ACCESS_HO_LIST when the message being sent is a message other than the Origination Message or the Page Response Message if all of the preceding conditions hold and ACC_PROBE_HO_OTHER_MSG$_s$ is equal to '1'. If the above conditions are met, the mobile subscriber station 101 may perform an access probe handoff when the mobile subscriber station 101 declares a loss of the Paging Channel; the mobile subscriber station 101 may also perform an access probe handoff after the TA timer expires and the mobile subscriber station 101 declares an insufficiency of the Paging Channel.

Before the mobile subscriber station 101 transmits an access probe to the new base station 104, the mobile subscriber station 101 shall update the parameters based on the System Parameters Message, the Access Parameters Message and the Extended System Parameters Message on the associated new Paging Channel and process the parameters from the message. The mobile subscriber station 101 shall update the parameters based on the Neighbor List Message, Extended Neighbor List Message, or the General Neighbor List Message on the associated new Paging Channel and process the parameters from the message. If the mobile subscriber station 101 receives a Global Service Redirection Message which directs the mobile subscriber station 101 away from the new base station 104, the mobile subscriber station 101 shall not access the new base station 104. The mobile subscriber station 101 shall process these messages only once per access sub-attempt during an access attempt.

If the mobile subscriber station 101 performs an access probe handoff, the mobile subscriber station 101 shall restart the access attempt probe sequence number on the new pilot, starting with the first probe of the first probe sequence of the access sub-attempt. The mobile subscriber station 101 shall not reset its access probe handoff count until the access attempt ends. The mobile subscriber station 101 shall abort the access attempt if the length of the message to be sent exceeds MAX_CAP_SIZE of the new base station. The mobile subscriber station 101 may monitor other Paging Channels which are in ACCESS_HO_LIST for T$_{42m}$ seconds.

Generation of the Initial Access Handoff List

ACCESS_HO_LIST is created immediately before transmitting the first access probe after entering the System Access State. When it is created, ACCESS_HO_LIST is defined as the set of pilots for which the following apply:

The strength of all members exceeds T_ADD.

Each member other than the Active Set pilot has the corresponding ACCESS_HO_ALLOWED field in the NGHBR_REC equal to '1'.

Includes the Active Set pilot that the mobile subscriber station monitors when the mobile subscriber station enters the System Access State.

As a list, meets the following sizing conditions:

All members can be contained in the Access Channel message without exceeding the maximum capsule size.

The number of members shall not exceed N$_{13m}$.

If more than one set of pilots exist that meet the above criteria, the mobile subscriber station shall include in the initial ACCESS_HO_LIST the set of pilots that meet the above criteria and whose members have the greatest pilot strength.

Update of the Access Handoff List

When the mobile subscriber station 101 performs an access probe handoff to a pilot which was not previously included in ACCESS_HO_LIST, it adds the pilot to ACCESS_HO_LIST. The mobile subscriber station 101 can add one or more new pilots other than the Active Set pilot to ACCESS_HO_LIST before transmitting an access probe if ACC_HO_LIST_UPD$_s$ is equal to '1'. When it is updated before transmitting a subsequent access probe, ACCESS_HO_LIST is defined as the set of pilots for which the following apply:

The strength of all members to which access probes have not been transmitted exceeds T_ADD.

Each member other than the pilot to which the first access probe in the System Access State was transmitted has the corresponding ACCESS_HO_ALLOWED field in the NGHBR_REC equal to '1'.

Includes the Active Set pilot to which the next access probe will be transmitted.

Includes all pilots to which access probes have been transmitted since entering the System Access State.

As a list, meets the following sizing conditions:

All members can be contained in the Access Channel message without exceeding the maximum capsule size.

The number of members shall not exceed N$_{13m}$

If more than one set of pilots exist, excluding members to which access probes have been transmitted since transmitting the first access probe in the System Access State, that meet the above criteria, the mobile subscriber station 101 shall include in ACCESS_HO_LIST a set of pilots that meet the above criteria, excluding members to which access probes have been transmitted since transmitting the first access probe in the System Access State, and whose members have the greatest pilot strength.

System for Wireless Communication Connection Handoff Service

The system for wireless communication connection handoff service 115 operates in the Mobile Switching Center 103 and FIG. 2 illustrates in flow diagram form the operation of the present system for providing wireless communication connection handoff service to wireless communication subscribers 115. The philosophy of this system is to assume that an incoming subrate call from a mobile subscriber station 101 must be connected through the base station 102 to an outgoing channel to the Selection Distribution Unit 110A and then on to the Mobile Switching Center 103. In the existing system, the incoming channel is selected by the mobile subscriber station 101 and the subrate channel is selected by the Mobile Switching Center 103. This results in the connection through the base station 102 via the selected subrate channel. Now assume that for the same call a second subrate channel must be established from a different base station 104 connected through a different Selection Distribution Unit 110B. Since the Mobile Switching Center 103 selects the trunk CIC it is likely that multiple connections to multiple base stations from the Mobile Switching Center 103 need to be hunted by the Mobile Switching Center 103 to serve a single call when the Access Probe HO is introduced to the mobile switching network. Presently, the Mobile Switching Center 103 has two choices to serve the HO request during the call origination/termination. The first choice is to provide a CIC via a Channel Assignment Message to the first base station 102 that responds to the PAGE REQUEST and ignore subsequently received responses. This process cancels the benefit provided by the Access Probe HO feature. The second case provides a CIC via a Channel Assignment Message to all of the base stations that respond to the PAGE RESPONSE and let the base stations fight among themselves as to which controls the Selection Distribution Unit. This process will fail since a call cannot be served by multiple Selection Distribution Units.

In contrast, the present system for providing wireless communication connection handoff service 115 in response to receipt of a PAGE RESPONSE.probeHO message from a first base station 102, saves the Cell IDs that are contained in the PAGE RESPONSE or CM REQUEST at step 201 when the first PAGE RESPONSE arrives at the Mobile Switching Center 103. The cell IDs contained in the first received PAGE RESPONSE are likely to be the ones that are involved in the Access Probe HO. The Mobile Switching Center 103 transmits a Channel Assign Request containing a CIC to the first base station 102 at step 202. At step 203, in response to receipt of a PAGE RESPONSE.probeHO message from a second base station 104, the present system for providing wireless communication connection handoff service 115 either saves the Cell IDs that are contained in the PAGE RESPONSE or ignores the received message. Subsequently, the mobile subscriber station 101 moves out of the service area of the first base station 102 and, upon receiving an Assign Failure from the base station 102 with an indication of AccessProbe HO at step 204, the Mobile Switching Center 103 at step 205 sends a HO_REQUEST message to the base station (second base station 104) identified by the next cell ID stored in memory. The Mobile Switching Center 103 does not have to waste its resources constantly hunting CISs for IS-95B mobile station originated calls, and it is implicit that the Mobile Switching Center real time capacity increases drastically. The Access Probe HO does not conflict with CAMSHO (Channel Assignment into Soft Handoff) to drive the base station into overload.

Summary

The system for wireless communication connection handoff service addresses the CDMA radio congestion problem from the Mobile Switching Center point of view, thereby providing a unified approach to the problem of access failures for CDMA wireless communication service. In operation, the mobile subscriber station forms a message and forwards it to the Mobile Switching Center to indicate the signal strength of the various base stations that have responded to the access probe. The Mobile Switching Center saves this data for later use when the mobile subscriber station moves out of range of the initially selected base station. The Mobile Switching Center reviews the stored data and, if a CIC is available to one of the identified base stations, the channel is allocated and the stored data is flushed. Thus, the need for another probe sequence is avoided and the initially provided base station signal strength data is reused to process a call handoff.

What is claimed:

1. A system for providing wireless communication connection handoff service to wireless subscribers, equipped with subscriber wireless stations, in a wireless communication system which comprises a mobile switching center that controls the operation of a plurality of base stations that communicate with said subscriber wireless stations, comprising:

means, responsive to receipt of a page response/setup request from one of said subscriber wireless stations, for storing data indicative of a plurality of base stations that are capable of serving said one of said subscriber wireless stations;

means for assigning a wireless communication channel from said mobile switching center to a first selected one of said identified plurality of base stations that are capable of serving said one of said subscriber wireless stations to enable said first selected one of said identified plurality of base stations to communicate with said one of said subscriber wireless stations;

means, responsive to a subsequently received request from a one of said subscriber wireless stations indicative of handoff request, for retrieving said stored data indicative of said plurality of base stations that are capable of serving said one of said subscriber wireless stations; and means for assigning a wireless communication channel from said mobile switching center to a second selected one of said plurality of base stations that are capable of serving said one of said subscriber wireless stations to enable said second selected one of said identified plurality of base stations to communicate with said one of said subscriber wireless stations.

2. The system of claim 1 wherein said means for storing comprises:

means for storing data from only a first of said at least one base station that transmits said page response.

3. The system of claim 1 wherein said means for storing comprises:

means for storing data from a plurality of said at least one base station that transmits said page response.

4. A method for providing wireless communication connection handoff service to wireless subscribers, equipped with subscriber wireless stations, in a wireless communication system which comprises a mobile switching center that controls the operation of a plurality of base stations that communicate with said subscriber wireless stations, comprising the steps of:

storing in a memory, in response to receipt of a page response/setup request from one of said subscriber wireless stations, data indicative of a plurality of base stations that are capable of serving said one of said subscriber wireless stations;

assigning a wireless communication channel from said mobile switching center to a first selected one of said identified plurality of base stations that are capable of serving said one of said subscriber wireless stations to enable said first selected one of said identified plurality of base stations to communicate with said one of said subscriber wireless stations;

retrieving, in response to a subsequently received request from a one of said subscriber wireless stations indicative of handoff request, for retrieving said stored data indicative of said plurality of base stations that are capable of serving said one of said subscriber wireless stations; and assigning a wireless communication channel from said mobile switching center to a second selected one of said plurality of base stations that are capable of serving said one of said subscriber wireless stations to enable said second selected one of said identified plurality of base stations to communicate with said one of said subscriber wireless stations.

5. The method of claim 4 wherein said step of storing comprises:

storing data in said memory from only a first of said at least one base station that transmits said page response.

6. The method of claim 4 wherein said step of storing comprises:

storing data in a memory from a plurality of said at least one base station that transmits said page response.

7. A system for providing wireless communication connection handoff service to wireless subscribers, equipped with subscriber wireless communication devices, in a wireless communication system which comprises a mobile switching center that controls the operation of a plurality of base stations that communicate with said subscriber wireless communication devices, comprising:

means, responsive to receipt of a page response/setup request by at least one base station from a subscriber at a subscriber wireless communication device, for storing data contained in said page response/setup request indicative of a plurality of base stations that are capable of serving said one of said subscriber wireless stations and signal connectivity indications;

means for assigning a wireless communication channel, for use by said subscriber wireless communication device, to a first selected one of said plurality of base stations that are capable of serving said one of said subscriber wireless stations to enable said first selected one of said identified plurality of base stations to communicate with said one of said subscriber wireless stations;

means, responsive to a subsequently received request from said subscriber wireless communication device indicative of handoff request, for retrieving said stored data indicative of said plurality of stations that are capable of serving said one of said subscriber wireless stations and signal connectivity indications; and means for assigning a wireless communication channel for use by said subscriber wireless communication device to a second selected one of said plurality of base stations that are capable of serving said one of said subscriber wireless stations.

8. A method for providing wireless communication connection handoff service to wireless subscribers, equipped with subscriber wireless communication devices in a wireless communication system which comprises a mobile switching center that controls the operation of a plurality of base stations that communicate with said subscriber wireless communication devices, comprising:

storing in a memory, in response to receipt of a page response/setup request by at least one base station from a subscriber at a subscriber wireless communication device, data contained in said page response/setup request indicative of a plurality of base stations that are capable of serving said one of said subscriber wireless stations and signal connectivity indications;

assigning a wireless communication channel for use by said subscriber wireless communication device to a first selected one of said plurality of base stations that are capable of serving said one of said subscriber wireless stations to enable said first selected one of said identified plurality of base stations to communicate with said one of said subscriber wireless stations;

retrieving from said memory, in response to a subsequently received request from said subscriber wireless communication device indicative of handoff request, said stored data indicative of said plurality of base stations that are capable of serving said one of said subscriber wireless stations and signal connectivity indications; and assigning a wireless communication channel for use by said subscriber wireless communication device to a second selected one of said plurality of base stations that are capable of serving said one of said subscriber wireless stations.

* * * * *